Aug. 23, 1932.   R. A. DARLING   1,872,905

REAR VISION MIRROR

Filed Feb. 27, 1932

INVENTOR
Roland A. Darling
BY Popp and Powers
ATTORNEYS

Patented Aug. 23, 1932

1,872,905

UNITED STATES PATENT OFFICE

ROLAND A. DARLING, OF BUFFALO, NEW YORK

REAR VISION MIRROR

Application filed February 27, 1932. Serial No. 595,606.

This invention relates to improvements in rear vision mirrors for automobiles and contemplates a mirror of novel form which is adapted to be secured adjacent the rear window of an automobile so that the operator thereof may ascertain accurately the position of the rear end of the vehicle with relation to an adjacent object.

In order to facilitate the operation of an automobile it is the practice to provide a window at the rear thereof whereby the operator may ascertain the proximity of objects at the rear of the vehicle. It is also the practice to employ a rear vision mirror which is positioned in front and above the operator and so arranged that the operator may see to the rear of the vehicle through the said window without the necessity of turning his head. While the arrangement described serves in a general way the purpose in view it is not satisfactory where accurate knowledge of the exact proximity of the rear of the vehicle relative to an adjacent object is desired for the reason that by virtue of the relative positions of the mirror and the window it is impossible to see, and hence determine, the exact location of the rearmost parts of the vehicle as, for example, the bumper and fenders.

The principal object of the invention is to provide a novel form of mirror which, when employed in the manner described, is adapted to reflect an image of an area behind the vehicle which in width is substantially the width of the vehicle and which relative to the length of the vehicle extends from the rearmost parts of the vehicle body rearwardly to a substantial distance, whereby the proximity of the said parts relative to an adjacent object may be readily ascertained.

The invention is illustrated in the accompanying drawing, in which.

Figure 1:
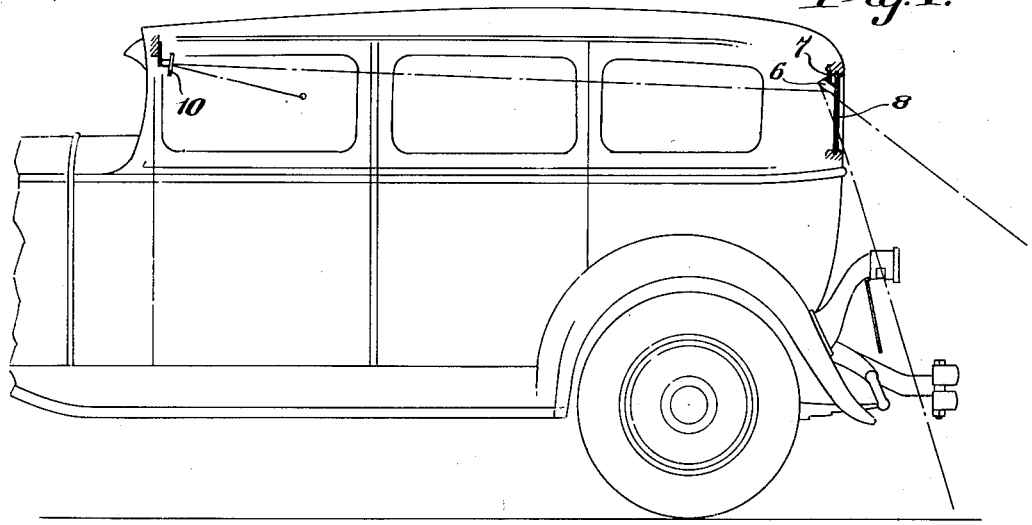
Figure 1 is a side elevation of an automobile showing a mirror embodying features of the invention employed in connection therewith.
Figure 2:
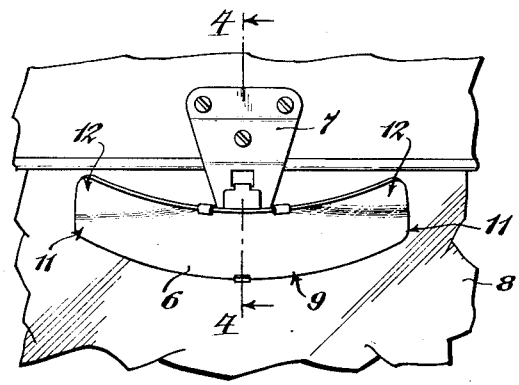
Figure 2 is an enlarged fragmentary view in elevation of the mirror and associated parts of the vehicle.
Figure 3:
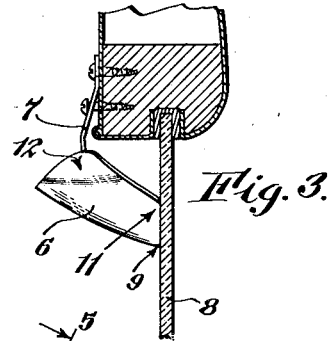
Figure 3 is an end elevation of the mirror, the associated parts of the vehicle body being shown in section.
Figure 4:
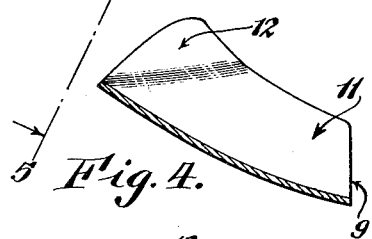
Figure 4 is an enlarged transverse section through the mirror taken along line 4—4 of Figure 2.
Figure 5:
Figure 5 is a top view of the mirror as it appears looking in the direction of line 5—5 of Figure 4.

As illustrated, the mirror 6 is supported by a suitable bracket 7 in the desired relation to the rear window 8 of the vehicle with which it is associated. Preferably the lower marginal edge 9 of the mirror is held against the window by the bracket, the said edge being suitably formed so that it engages the window throughout a substantial part of its length. The mirror, as supported by the bracket 7, extends angularly upward from the lower edge 9 and is of such a size that the image formed therein may be readily observed by the operator of the vehicle either by turning his head or by the use of the conventional rear vision mirror 10 (see Figure 1), it being understood that the location of the mirror relative to the window is preferably adjacent the upper marginal edge of the window and centrally of the ends thereof.

The mirror is convex in the direction of its length so that it covers an area at the rear of the vehicle which in width is substantially equal to the width of the vehicle and is convex in the direction of its width so that the length of the area covered by it is adequate for the purpose in view. The angle of inclination of the mirror is such that, with respect to that zone of the mirror in the vicinity of the line 4—4, the image formed in this portion of the mirror includes central parts of the vehicle body as, for example, the spare tire and bumper and the area thus included extends rearward from these parts a substantial distance in the direction of the length of the vehicle.

The ends 11 of the mirror cover the marginal portions of the area covered by the mirror. It will be understood that while the central portion of the mirror, that is to say, the portion in the vicinity of the line 4—4 covers an area at the rear of the automobile which includes central parts of the vehicle body and which extends rearwardly therefrom a substantial distance, the marginal portions of the area are covered by the opposite ends of the mirror. Hence, by virtue of the convexity of the mirror in the direction of its length the inner boundary of the area at the rear of the vehicle which is covered by the ends of the mirror would, unless provision were made to guard against this, begin a substantial distance behind the vehicle body. In other words, the area covered by the mirror would be substantially of the general outline of the mirror.

In accordance with the invention, however, the mirror is formed so as to compensate for its convexity in the direction of its length, whereby the operator of the vehicle is enabled not only to see the central body parts such as, for example, the central portion of the bumper but is also enabled to see parts of the body at the extreme sides of the vehicle, that is to say the ends of the bumper and the fenders. For this purpose the upper corners 12 of the mirror are curved rearwardly with respect to the remainder of the mirror, that is to say the degree of curvature of the mirror at these portions is greater than its normal convex curvature in the direction of its width. The portions 12 of the mirror are so formed with relation to the remainder of the mirror that they compensate for the curvature of the mirror in the direction of its length. In other words, despite the location of the ends 11 of the mirror relative to the central portion thereof an image of parts of the vehicle body which are in line with those parts covered by the central portion of the mirror is obtained.

From the foregoing it will be apparent that the formation of the mirror is such that the area covered thereby includes parts of the vehicle body across the entire width of the vehicle. The operator, therefore, is enabled to determine exactly the position of such parts relative to an adjacent object and to govern himself accordingly. The image which is observed by the operator covers an area substantially the width of the vehicle and the portions 12 are preferably so formed that they include the terminal portions of the bumper if such is used and the terminal portions of the rear fenders. Thus, the operator is enabled not only to accurately determine the position of objects directly behind the vehicle but also enabled to determine the position of objects to the rear and at the sides of the vehicle.

I claim as my invention:

1. A rear vision mirror for use in an automobile adapted to be supported adjacent the rear window thereof, said mirror being convex in the direction of its length so as to cover an area at the rear of the vehicle which in width is substantially equal to the width of the vehicle and being convex in the direction of its width so that its central portion covers an area which includes a central part of said vehicle and which extends rearwardly in the direction of the length of the vehicle a substantial distance, the convexity of the said mirror in the direction of its width being increased at the ends so as to cover a part of the vehicle at the side thereof, whereby the operator is enabled to ascertain accurately the proximity of said parts relative to an adjacent object.

2. A rear vision mirror for an automobile adapted to be supported adjacent the rear window thereof, said mirror being convex in the direction of its length so as to cover an area at the rear of the vehicle which in width is substantially equal to the width of the vehicle and being convex in the direction of its width so that its central portion covers an area which includes a central part of said vehicle and which extends rearwardly in the direction of the length of the vehicle a substantial distance, the convexity of the mirror in the direction of its width being increased at the opposite upper corners so as to cover parts of the vehicle at the sides thereof, whereby the operator is enabled to ascertain accurately the proximity of said parts relative to an adjacent object.

3. A rear vision mirror for use in connection with the rear window of an automobile and means for securing said mirror against said window, said mirror being convex in the direction of its length so as to cover an area at the rear of the vehicle which in width is substantially equal to the width of the vehicle and being convex in the direction of its width so as to cover an area which includes a central part of said vehicle and which extends rearwardly in the direction of the length of the vehicle a substantial distance, the convexity of the mirror in the direction of its width being increased at the opposite upper corners thereof so that the area covered by the mirror includes parts of the vehicle body at the sides thereof, whereby the operator is enabled to ascertain accurately the proximity of said parts relative to an adjacent object, the lower margin of said mirror being formed to contact said window throughout a substantial portion of its length.

4. A rear vision mirror for an automobile adapted to be supported adjacent the rear window thereof, said mirror being convex in the direction of its length so as to cover an area at the rear of the vehicle which in width is substantially equal to the width of the vehicle and being convex in the direction of its width so as to cover an area which includes a central part of said vehicle and which extends rearwardly in the direction of the length of the vehicle a substantial distance, the opposite ends of the said mirror being formed to compensate for the curvature of the mirror in the direction of its length so that the ends of the mirror cover parts of the body at the sides thereof, whereby the operator is enabled to ascertain accurately the proximity of said parts relative to an adjacent object.

In testimony whereof I affix my signature.

ROLAND A. DARLING.